United States Patent [19]

Olson

[11] 4,140,443
[45] Feb. 20, 1979

[54] MANURE HANDLING SYSTEM

[76] Inventor: David A. Olson, 620 S. Broadway, Albert Lea, Minn. 56007

[21] Appl. No.: 829,490

[22] Filed: Aug. 31, 1977

[51] Int. Cl.² .......................... F04B 7/04; F04B 15/00; B67D 5/62
[52] U.S. Cl. .................................... 417/490; 417/900; 222/146 HE
[58] Field of Search ................ 417/551, 900, 490; 92/177; 91/275; 222/146 HE

[56] References Cited

U.S. PATENT DOCUMENTS

| | | | |
|---|---|---|---|
| 2,174,319 | 9/1939 | Gastrow | 222/146 HE |
| 2,319,981 | 5/1943 | Fitzgerald | 417/900 |
| 2,518,748 | 8/1950 | Breor | 222/146 HE |
| 2,755,966 | 7/1956 | Lindars | 91/275 |
| 3,153,385 | 10/1964 | Bowon, Jr. | 417/490 |
| 3,234,882 | 2/1966 | Douglas et al. | 91/275 |
| 3,266,433 | 8/1966 | Mason | 417/900 |
| 3,872,981 | 3/1975 | Hedlund | 198/531 |
| 4,028,017 | 6/1977 | Kobiske | 417/900 |
| 4,034,203 | 7/1977 | Cooper | 222/146 HE |

FOREIGN PATENT DOCUMENTS 855495 10/1970 Canada ..................................... 92/177

Primary Examiner—William L. Freeh
Attorney, Agent, or Firm—Burd, Braddock & Bartz

[57] ABSTRACT

A handling system to move material and particularly manure from a collection area to a holding or storage station. The manure handling system includes a manure pump assembly having a hopper mounted over a pump housing which defines a triangularly shaped pumping chamber. An outlet valve located at the end of the chamber is urged closed by a rubber spring internally connected in the chamber. A triangular ram or piston shaped to conform to the shape of the chamber reciprocates in the pumping chamber to push manure delivered from the hopper past the outlet valve to a discharge pipe leading to a holding station. Means are provided for heating the discharge pipe and the pumping chamber, thus to permit year-round and above-ground use of the system.

43 Claims, 12 Drawing Figures

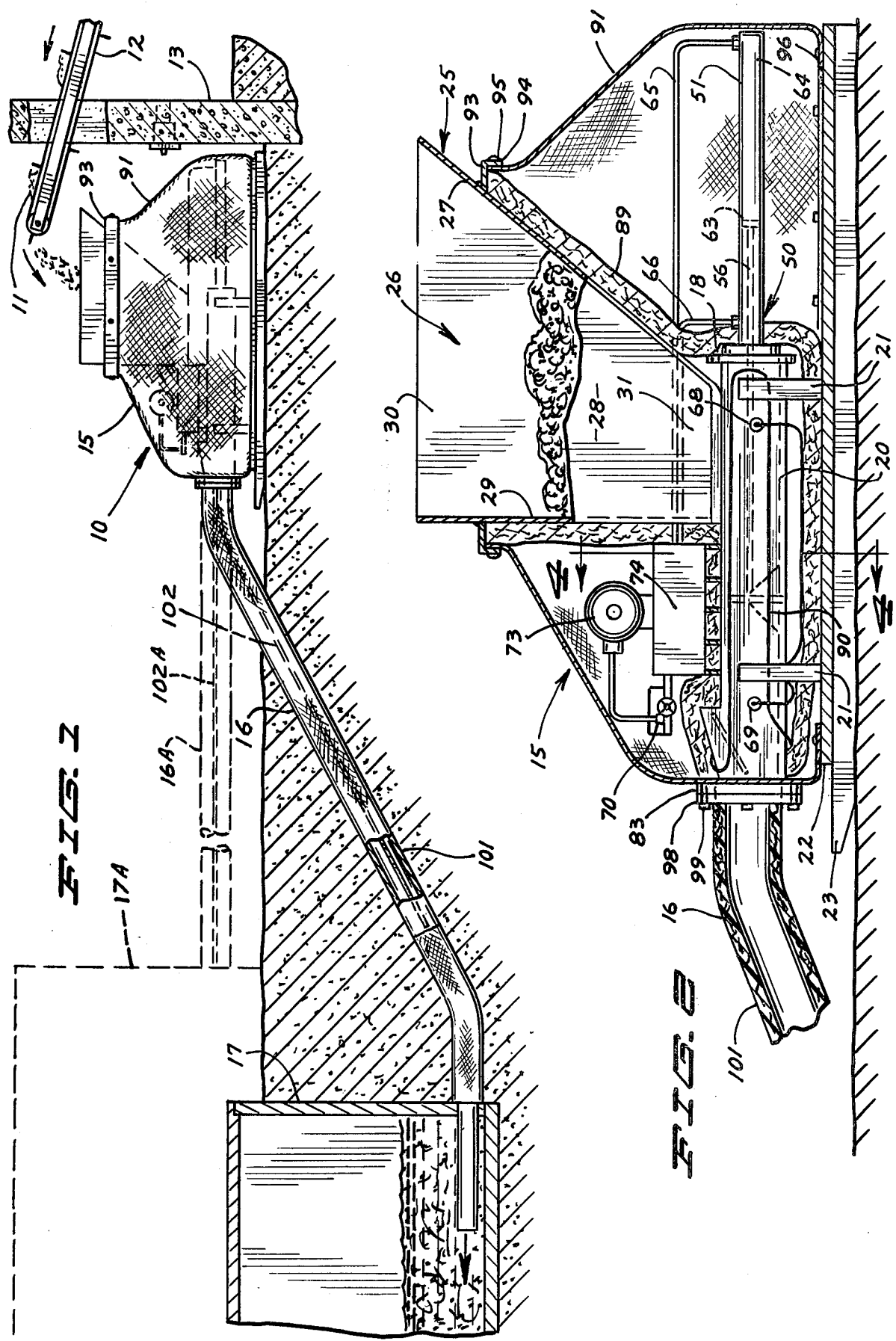

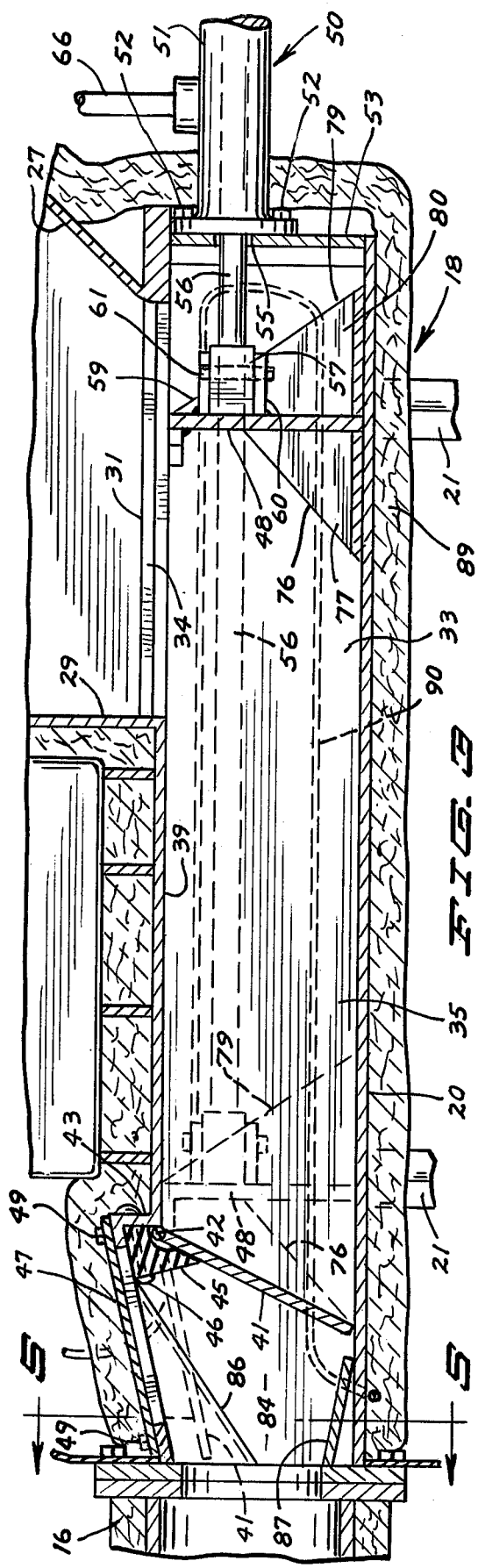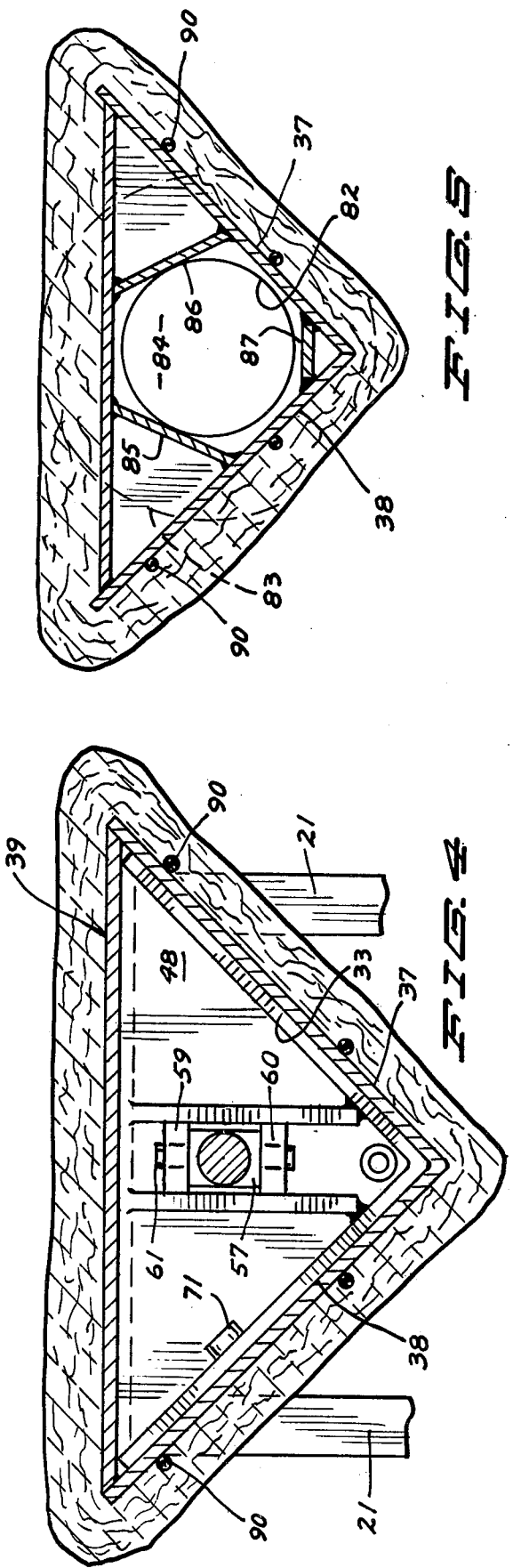

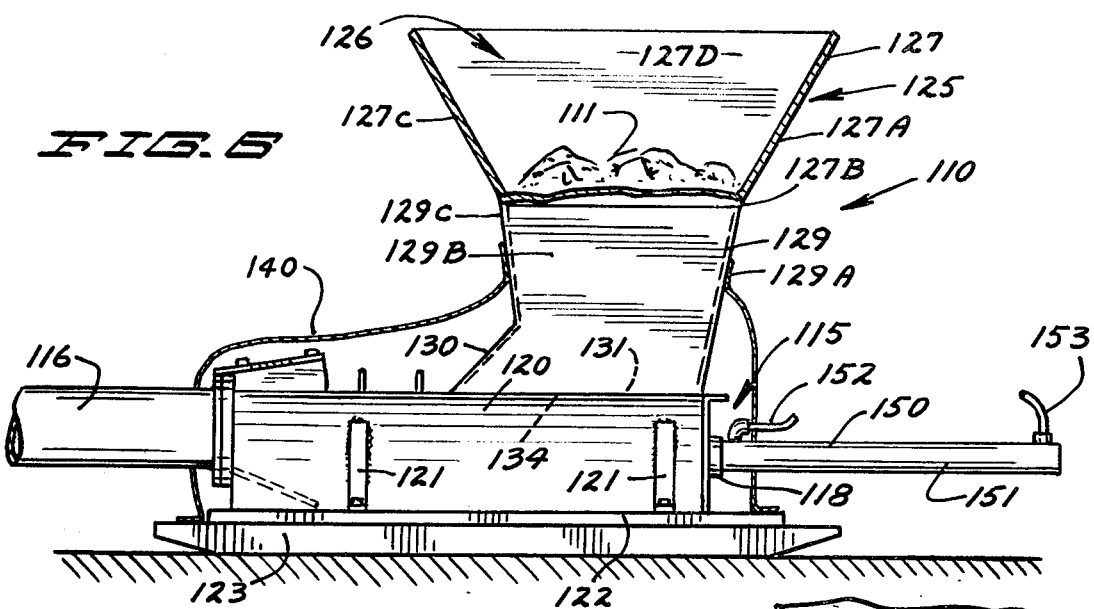
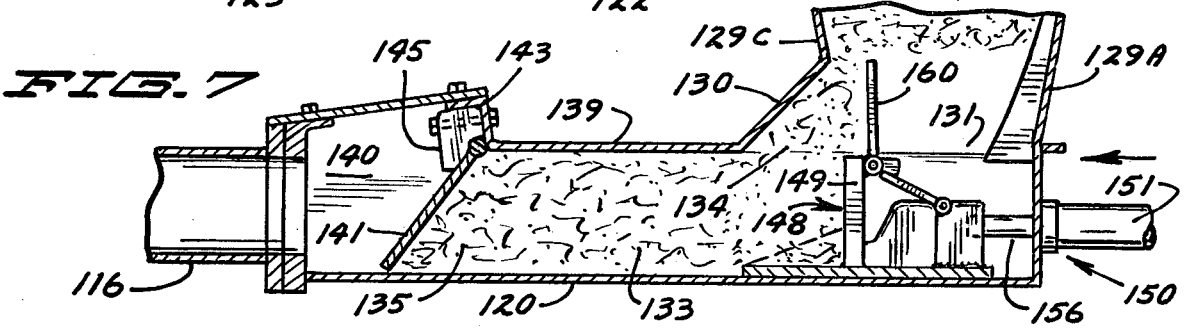
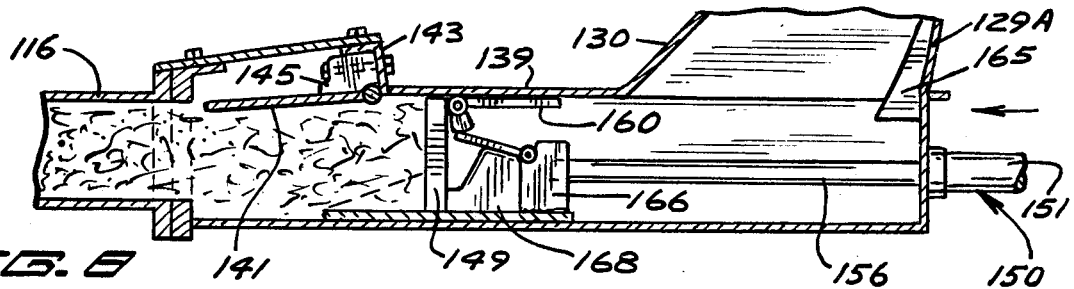
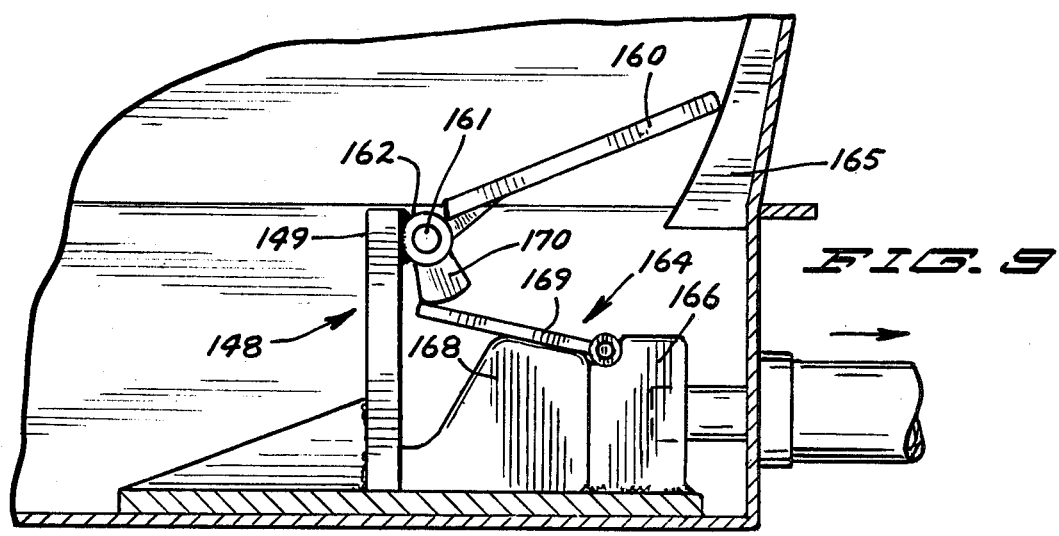

MANURE HANDLING SYSTEM

BACKGROUND OF THE INVENTION

It is advisable for the agricultural manager to have an efficient manure handling system in order to make efficient use of labor while optimizing disposition of manure. Since under certain weather conditions, manure should not or cannot be applied to the farm land, a holding area or station is necessary and an efficient means to get the manure from the collection area to the holding area as needed. Typical holding areas include earth basins, silos, storage platforms and the like located remote from the collection area at distances of up to 300 feet or more.

Typical manure handling systems can include large piston manure transfer pumps. These pumps can be installed above or below floor level and include a hopper to receive the manure at a collection point. Manure is loaded into the hopper with a tractor scraper or from a barn cleaner conveyor or the like. Such pumps can be of the hollow piston variety, for example, see U.S. Pat. No. 3,872,981 to Hedlund issued Mar. 25, 1975, or more commonly, of the solid piston variety. For example, see U.S. Pat. No. 3,103,276 to Schmitzer issued Sept. 10, 1963. In such pumping systems the collection hopper discharges into a pumping chamber of the pump. The pump piston moves the manure out of the pumping chamber, usually through a discharge valve to a discharge pipe where the manure is carried to a holding station. The pistons and corresponding pumping chambers generally are cylindrical although some have a rectangular or square cross-sectional configuration thus necessitating a transition zone to the round discharge pipe.

A common difficulty experienced with such systems is the propensity of somewhat fluid manure mixture to freeze in the system in cold weather. An additional difficulty can occur when the system has a transition from a rectangular or non-circular pumping chamber to a circular discharge pipe. Stagnant areas are apt to develop and collect manure and self-cleaning of the system is not likely. Additional difficulty occurs with bridging, especially when the manure has a high straw content.

SUMMARY OF THE INVENTION

The invention relates to a material handling system operable to move material from a collection location to a holding or storage station. In particular, the invention is directed to a system of handling manure and other organic material and to move it from a collection station such as a barn or the like to a holding or storage station as an earth basin, a tank or the like. The system is adapted for year-round usage even in cold weather climates and can be used with a discharge pipe, or portions thereof, located above as well as below ground level. The pump assembly of the system is substantially self-cleaning and is sealed to prevent manure leakage.

The pump assembly includes a hopper mounted on a pump housing for receipt of manure. The pump housing defines a pumping chamber, and the discharge or outlet of the hopper is located over the inlet to the pumping chamber. The pumping chamber is preferably triangular in cross sectional shape with a downwardly directed apex such that the widest portion of the chamber for receipt of manure is contiguous with the hopper outlet. A plunger or piston assembly associated with the pump assembly includes a piston or ram mounted on a rod which reciprocates in the pumping chamber to move manure through a discharge valve to a discharge pipe which leads to a holding or storage facility. The ram is triangularly shaped to conform to the shape of the chamber. Perferably the discharge valve is urged in the closed position by a rubber spring fastened internally in the chamber without exterior protrusions.

In one form of the invention, heating elements are located around the pumping chamber and the discharge pipe and are surrounded by insulative jackets in order to provide heat so that the system can be used in a subfreezing environment.

IN THE DRAWINGS

FIG. 1 is a side elevational view of a manure handling system of a first form of the invention functioning to move manure from a collection point to a holding station;

FIG. 2 is an enlarged side elevational view in section of the pumping unit of the manure handling system of FIG. 1 showing the plunger of the manure pump in advanced position;

FIG. 3 is an enlarged side sectional view of the manure pump of the pump assembly of FIG. 2 showing the plunger in a relatively retracted position approaching the extreme rearward position;

FIG. 4 is an enlarged sectional view taken along the line 4—4 of FIG. 2;

FIG. 5 is a sectional view taken along the line 5—5 of FIG. 3;

FIG. 6 is a side elevational view partly in section showing a manure handling system according to a second form of the invention;

FIG. 7 is a partial sectional view of the manure handling system of FIG. 6 with the ram assembly in a retracted position in the pumping chamber;

FIG. 8 is a partial sectional view of the manure handling system of FIG. 6 with the ram assembly in an advanced position in the pumping chamber;

FIG. 9 is an enlarged fragmentary view in section showing a portion of the manure handling system of FIG. 6 with the ram assembly in a retracted position in the pumping chamber;

DESCRIPTION OF PREFERRED EMBODIMENT

Figure 10:
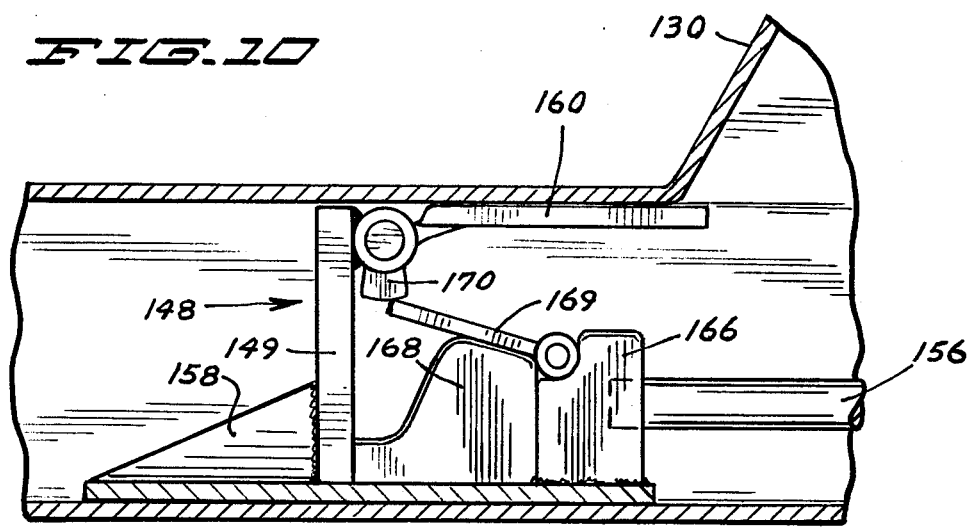
FIG. 10 is an enlarged fragmentary view in section showing a portion of the manure handling system of FIG. 6 with the ram assembly in an advanced position in the pumping chamber.

Referring to the drawings, there is shown in FIG. 1 a manure handling system according to a first form of the invention indicated generally at 10 in position to collect manure 11 transferred from a cleaning system shown to include a conveyor belt 12 extending through an opening in the side wall 13 of a barn or other such building. The manure handling system includes a pump assembly 15 connected to a discharge pipe 16 which leads to and empties into a storage or holding tank 17.

As shown in FIG. 2, pump assembly 15 includes a manure pump 18 having a pump housing 20 supported by legs 21 on a flat platform 22. Platform 22 is securely assembled to a pair of horizontal skids 23 (only one of which is shown) to facilitate movement of the entire pump unit. A manure collection hopper 25 is mounted on pump housing 20, having a relatively wide, upwardly open inlet mouth 26. Hopper side walls 27–30 converge downwardly to an outlet opening 31 for discharge of manure collected in the hopper.

Pump housing 20 has interior walls which define an elongate, generally horizontal pumping chamber 33 (see FIG. 3). Pumping chamber 33 has an inlet opening 34 at the rearward end thereof in contiguous relationship to and coextensive with the outlet opening 31 of collection hopper 25 so that manure is transferable from the inside of hopper 25 to the pumping chamber 33 without leakage. Pumping chamber 33 has a normally closed forward end 35 located somewhat ahead of the leading edge of the inlet opening 34. As shown in FIG. 4, pumping chamber 33 is triangular in cross-sectional shape, having a downwardly directed apex defined by angularly inclined side walls 37, 38, and a horizontal top wall 39. Inlet opening 34 thereby occurs at the location of the widest horizontal dimension of the chamber 33 for facilitating receipt of manure from the collection hopper 25.

The normally closed end portion 35 of pumping chamber 33 is closed by a one-way valve comprised as a closure plate or spring-loaded gate 41. Gate 41 is pivoted, as by a pin 42, to an upstanding wall 43 located at the forward end of the pumping chamber 33 and extending upward from the top wall 39. The gate extends downwardly and slightly forward from the upstanding wall 43 to the apex of the chamber 33 and is shaped to conform to the side walls 37, 38 when in the closed position shown in solid lines in FIG. 3. Gate 41 is pivoted to an open position to provide a discharge passage for discharge of material from pumping chamber 33.

A pair of rubber springs 45 (only one of which is shown in FIG. 3) bias the gate 41 in a closed position. Rubber spring 45 is affixed to upstanding side wall 43 at one corner of gate 41 as by a suitable fastener 46, and bears between the gate 41 and a top wall 47 which extends forwardly and slightly downward from the upper edge of upstanding wall 43. Gate 41 is openable about pivot pin 42 against the influence of rubber spring 45 responsive to the pressure of manure pressed against it from pumping chamber 33. The use of rubber spring 45 is preferred because it is sealed in pump housing 20 without exterior protrusions which could result in leakage. Spring 45 does not become dirty and clogged by the moving manure, and provides a high spring force. As shown, removal of bolts 49 permits removal of top wall 47 for access to gate 41 and spring 45 for repair, cleaning or the like.

A reciprocating plunger or ram 48 is located in pumping chamber 33 for reciprocating movement therein. Ram 48 has a working face which is triangular in shape to conform to the shape of the pumping chamber 33 with edges in close relationship to the angular side walls 37, 38, and to the top wall 39 when working in the closed forward end 35 of chamber 33. A suitable motor for reciprocation of ram 48 in pumping chamber 33 is shown in FIGS. 2 and 3 to include a double-acting hydraulic reciprocating motor 50. Motor 50 has an elongate, hydraulic cylinder 51 fastened by suitable bolts 52 to the rearward end wall 53 of pumping chamber 33 near the inlet opening 34. End wall 53 has an opening 55 coaxial with the axis of cylinder 51. A rod 56 reciprocates in the cylinder 51 and has an end passing through the opening 55 of end wall 53 for connection to ram 48. The end of rod 56 is equipped with a fitting 57 which is positioned between a pair of parallel, horizontal clevis members 59, 60 extended from the rear face of ram 48. A pin 61 passes through mutually aligned holes in the clevis member 59, fitting 57 and clevis member 60 to secure the end of the rod 56 to the ram 48.

As shown in phantom in FIG. 2, the opposite end of rod 56 is fastened to a piston 63 located in the chamber 64 of cylinder 51. A first hydraulic line 65 extends to a rearward end of the cylinder 51 in fluid communication with the chamber 64 and a second hydraulic line 66 is affixed to the forward end of the cylinder 51 in fluid communication with the chamber 64. Alternately supplying hydraulic fluid through the first and then the second hydraulic lines 65, 66 is effective to cause reciprocation of the piston 63 in the cylinder chamber 64 and thus the ram 48 in the pumping chamber 33.

A first self-contained proximity switch 68 is located on the pump housing 20 toward the rear end of the pumping chamber 13 in a vicinity representative of the rearward extreme of movement of the ram 48 in the pumping chamber 33. A second such proximity switch 69 is located on the pump housing 20 at the forward end thereof in relative proximity to the forward extreme of movement of the ram 48 in the pumping chamber 33. The first and second proximity swtiches 68, 69 and are connected through a conventional control box 70 to transmit information pertaining to the location of the ram 48 in the pumping chamber 33. As shown in FIG. 4, a position sensor 71 such as a magnet is located on the ram 48. The sensor 71, when close to one of the proximity switches 68, 69, influences the switch. The first and second hydraulic fluid lines 65, 66 are also connected to the control box which is connected to an electric hydraulic fluid pump 73 for pumping of hydraulic fluid from a suitable reservoir 74 through the hydraulic fluid line 65, 66.

In use, ram 48 advances in the pumping chamber 33 when hydraulic fluid is delivered through the first hydraulic fluid line 65. When the ram 48 reaches the location of the second proximity switch 69, sensor 71 influences the switch 69 through the control box 70 to reverse the flow of hydraulic fluid such that it begins to flow through the second hydraulic fluid line 66. This causes reversal of the movement of the ram 48 in the direction toward the rear of the pumping chamber 33. When the ram 48 reaches the location of the first proximity switch 68, the sensor 71 influences the switch 68, and through the control box 70, flow of hydraulic fluid through the hydraulic lines is again reversed and flow occurs through the first hydraulic fluid line 65 to advance the ram in the chamber 33 for reciprocal movement. The use of proximity switches over other forms of switches is preferred as there are no resultant openings to the chamber through which manure can leak. The pump housing forms an imperforate envelope open only at the inlet opening and the discharge passage.

Ram 48 has a plow-like front brace 76 comprised of a pair of triangularly shaped plates 77 (see FIG. 3) joined in a V configuration with an apex situated in and conforming to the apex of pumping chamber 33. The rear edges of plates 77 extend approximately one-half the distance up and are integrally secured to the side edges of the working face of ram 48 whereby the side plates 77 are disposed in adjacent, close parallel relationship to the side walls 37, 38 of pumping chamber 33. Front brace 76 serves a plow-like function to continuously clear the side walls 37, 38 and to move manure through the pumping chamber 33 and additionally stabilizes ram 48 from forward tilting thereof.

Ram 48 also has a rear brace 79 comprised of a pair of triangularly shaped plates 80 jointed in a V configuration with an apex situated in and conforming to the apex of pumping chamber 33. The forward edges of the plates 80 are integrally secured to the side edges of the working face of ram 48 and extend rearward therefrom. The side plates 80 are also disposed in adjacent, close parallel relationship to the side walls 37, 38 of pumping chamber 33. The rear brace 73 stabilizes the ram 48 from tilting in a rearward direction and serves a cleaning function to move away manure that accumulates behind the ram 48.

As shown in FIGS. 2 and 5, a discharge opening 82 from pumping chamber 33 is circular in cross sectional shape and is surrounded by a flange 83 for connection to the discharge pipe 16. Pumping chamber 33 includes a transition chamber 84 located between the gate 41 and the discharge opening 82. As shown, three transition plates 85, 86, 87 are positioned in transition chamber 84 and are positioned in a funnel-like orientation to effect a smooth transition for the flow of manure from the triangular cross-sectional shaped pumping chamber 33 to the circular cross-sectional discharge opening 84 in discharge pipe 16. Transition plates 85, 86, 87 are located in spanning relationship to the corners of the triangular pumping chamber 33 and in converging relationship toward the discharge opening 82 whereby transition is made from a triangular cross-sectional area to a hexagonal cross-sectional area approximating the circular discharge opening. The transition plates 85, 86, 87 diverge rearwardly in the transition zone 84 and blend rearwardly into the respective corners of the triangular cross-sectional chamber such that no cavities or voids are formed in which manure might be trapped or remain stagnant.

A heat insulative jacket 89 surrounds the pump housing 20 and the lower portion of collection hopper 25. Jacket 89 can be formed from a glass fiber material, expanded foam plastic or the like material chosen for heat insulative properties. The purpose of jacket 89 is to retain heat held and generated by the manure to maintain it in the more fluid, easier-to-handle state in cold weather. To this same end, means are provided to supply heat to the pump housing 20 and thus provide heat to the pumping chamber 33. An electric heat cable 90 is trained back and forth along the length of pump housing 20 between the surface thereof and jacket 89. Heat cable 90 is preferably of the self-limiting variety thus to regulate its own heat output in response to temperature changes. As the ambient temperature drops, heat cable 90 increases in heating output, and as the temperature rises, it decreases in heating output at each point along the strip. The heat generated by heat cable 90 is transferred primarily to the pump housing 20 due to the insulative qualities of the jacket 89.

Referring to FIGS. 1 and 2, a cover 91 is provided to prevent contamination of the exterior parts of the manure pump assembly by manure falling from conveyer 12. A collar or rail 93 is secured to and circumscribes the upper portion of the hopper 25 and has a downwardly turned lip 94. The upper edges of the cover 91 are secured to the downwardly turned lip 94 by suitable fasteners 95 such as rivets or nut and bolt assemblies. Cover 91 extends from the rail 93 downwardly and outwardly to enclose the manure pump 18 and the remainder of the collection hopper 25, having an opening to accomodate the flange 83 of pump housing 20. The lower edges of the cover 91 are fastened as by suitable fasteners 96 to the upper surface of the platform 22. Cover 91 is preferably a flexible, durable material such as canvas, vinyl, heavy duty plastic or the like. Cover 91 prevents contamination not only from the manure but rain, snow, dirt, and other debris.

Referring still to FIGS. 1 and 2, discharge pipe 16 has an end flange 98 in mating relationship to the discharge flange 83 of pump housing 20 and secured thereto by suitable bolts 99. Discharge pipe 16 is also provided with an insulative jacket 101 in order to retain heat therein and facilitate use of pump assembly 15 in a cold enviroment. Insulative jacket 101 extends from the flange 98, covering the length of discharge pipe 16 to the inlet opening of the storage or holding tank 17. Insulative jacket 101 can be a plastic foam sheet wrapped around the discharge pipe 16, a glass fiber material or the like. Means provided to heat the discharge pipe include an electric heat tape 102 trained along the length of discharge pipe 16 adjacent the surface thereto and also covered by the insulative jacket 101. Heat tape 102 extends from the flange 98 at one end of the discharge pipe to a point beneath the frost line of the ground. Heat generated by the heat tape 102 is transferred primarily to the interior of the discharge pipe 16 due to the heat insulative qualities of the jacket 101. Heat tape 102 can also be of self-regulating variety which generates a larger degree of heat at lower temperatures.

Through the use of insulative jacket 101 and heat tape 102, the discharge pipe can extend for expanses above ground in a cold enviroment and maintain the manure being pumped therein in a more fluid and easier-to-handle state. As shown in phantom FIG. 1, a storage facility 17A can be located above ground with insulated discharge pipe 16A extending an expanse above ground to the storage facility. Heat tape 102A is operative to heat the discharge pipe and maintain manure traveling therein in a more fluid state.

In use, manure 11 is transferred by conveyer 12 to collection hopper 25 through the inlet mouth 36 thereof. With the ram 48 in the rearward or retracted position, the manure falls through the outlet 31 of the collection hopper, through the inlet 34 of pumping chamber 33 and into the pumping chamber 33. Ram 48 reciprocates in pumping chamber 33 as previously described. As the ram 48 advances in pumping chamber 33 it moves the manure collected therein forward toward and past the gate 41, beginning the most effective portion of the stroke after it advances into the forward end 35 of the pumping chamber 33. The gate 41 is opened against the bias of the spring 45 under the influence of the advancing manure to the position shown in phantom in FIG. 3 where the ram 48 is shown in phantom in the extreme advanced position. The forward brace 76 on ram 48 has a plow-like effect to advance the manure and keep the pumping chamber 33 relatively clean. Transition plates 85, 86, 87 promote the smooth transition of flow of manure from the triangularly shaped cross section of the pumping chamber to the circular cross section of the discharge pipe. Upon retraction of the ram 48, gate 41 closes rapidly under the bias of the spring 45 to prevent return of manure from the discharge pipe 16 under the effect of the vacuum created by the retracting plunger.

When ram 48 is in the forward or extended position, manure falls into pumping chamber 33 behind it. Upon retraction of ram 48, vacuum or suction created in the pumping chamber 33 is effective to pull manure from the collection hopper into the pumping chamber. Also upon retraction, manure accumulated behind ram 48 is forced over the upper edge of ram 48, partially back into the hopper 25, then to pumping chamber 33 ahead of ram 48. This action is effective to prevent bridging of manure entering from hopper 25. Rear brace 79 on ram 48 helps to clean the rearward portion of the pumping chamber 33 upon retraction and also helps to move the manure collected behind the ram up and over the top edge thereof.

Insulative jacket 89 prevents loss of any heat generated in the manure, and heat cable 90 adds heat to the pumping chamber 33 to maintain the manure in a relatively fluid condition in a cold environment to facilitate the handling thereof. As the manure passes into and through the discharge pipe 16 it is maintained in a fluid and easier-to-handle state by the insulative jacket 101 and the heat tape 102 covering the discharge pipe 16.

Pump housing 20 and pumping chamber 33 are advantageously fabricated in a triangular configuration whereby the inlet mouth to the chamber is located at the widest dimension thereof. The triangular configuration is easily fabricated requiring connection of side walls 37, 38 and a top wall 39 at the closed end 35. The triangular configuration permits movement of a high volume of manure while the chamber stays relatively clean.

The triangular cross-sectional configuration of the pumping chamber provides a wider inlet mouth than would be provided by a comparable circular cross-sectional configuration. The triangular configuration has fewer corners than would a square configuration, thus to tend to avoid development of stagnant regions.

Discharge pipe 16 opens into the lower portion of the storage or handling tanks 17 so as not to disturb a crust that can form at the top of the stored manure thus to prevent odor when the tank is open.

Referring to FIGS. 6 through 11 there is shown a manure handling system indicated at 110 according to a second form of the invention, particularly adapted to handle manure having a high bedding or high straw content. Manure having a high straw content, as might be scraped or removed from the barn floor, presents added difficulties. The manure-straw mixture is more prone to bridge in the collection hopper. Heavy straw holds air while the pump relies upon a vacuum or suction in order to pull manure into the pump chamber. In a heavy bedding mixture, the pump tends to pull the manure and air through the straw resulting in a loss of suction and an accumulation of straw in the throat of the hopper.

Referring to FIG. 6, handling system 110 includes a pump assembly 115 which is connected to a discharge pipe 116 which leads to and empties into a remote storage facility (not shown), that can be above or below the ground. Pump assembly 115 includes a manure pump 118 having a pump housing 120 supported by legs 121 on a flat platform 122. Platform 122 is securely assembled to a pair of skids 123 (only one of which is seen in FIG. 6) to facilitate movement of the entire manure handling assembly from place to place. A manure collection hopper 125 is mounted on the pump housing 120 and has a relatively wide, upwardly open inlet mouth 126.

Hopper 125 is divided into two stages comprising an upper collection portion 127 and a lower throat portion 129. Upper collection portion 127 includes downwardly converging side walls 127A through 127D extending from inlet 126 to the throat portion 129.

Throat portion 129 includes throat side walls 129A through 129D connected to and integrally extended from the lower edges of the respective sidewalls of the collection portion 127. Walls 129 form a vertically extended throat converging downwardly only slightly whereby the horizontal dimensions of throat remain relatively constant through the vertical length thereof. With such extended length, throat portion 129 is not apt to clog with manure bedding material due to its enlarged throat area in which material can accumulate.

At the lower edge of the front wall 129C of throat portion 129 is a forwardly extended front outlet wall 130 extending to pump housing 120. Front outlet wall 130 results in an expanded outlet 131 from hopper 125. Expanded outlet 131 facilitates transfer of material from the hopper to the pumping chamber.

Pump housing 120 has interior walls which define an elongate generally horizontal pumping chamber 133. Pumping chamber 133 has a top wall 139 with an inlet opening 134 at the rearward end thereof in contiguous relationship to and coextensive with the outlet opening 131 of collection hopper 125 so that manure is transferable from the inside of hopper 125 to the pumping chamber 133 without leakage. Pumping chamber 133 has a normally closed forward end 135 located somewhat ahead of the leading edge of inlet opening 134. Pumping chamber 133 can be trapezoidal or, as shown triangular in cross-sectional shape, having downwardly converging walls whereby the inlet opening occurs at the location of the widest horizontal dimension of the chamber 133 for facilitating receipt of manure from collection hopper 125. A cover 140 can cover the pump assembly 115 and lower portion of hopper 125.

Closure means for pumping chamber 133 is substantially the same as that earlier described relative to pump 18 of the first form of the invention. A spring loaded gate 141 is pivotally connected to the forward end of pump chamber 133 at the forward edge of top wall 139. A rubber spring 145 is connected to an upstanding wall 143 extending from the top wall 139 of pumping chamber 133. Gate 141 extends downward and slightly forward from the forward edge of top wall 139 in closing relationship to the walls of chamber 133. A transition chamber 140 is located on the opposite side of gate 141 and leads to the discharge pipe 116.

A reciprocating plunger or ram assembly 148 is located in pumping chamber 133 for reciprocating movement therein. A double acting hydraulic reciprocating motor 150 is operative for reciprocation of ram assembly 148 in chamber 143. Motor 150 has an elongate, hydraulic cylinder 151 fastened to the rearward end of pump housing 120. A rod 156 reciprocates in cylinder 151, passing through a suitable opening in pump housing 120 for connection to ram assembly 148. Hydraulic lines 152 and 153 extend from cylinder 151 to a remote hydraulic fluid source of reciprocation of rod 156 as earlier described relative to the first form of the invention.

Figure 12:
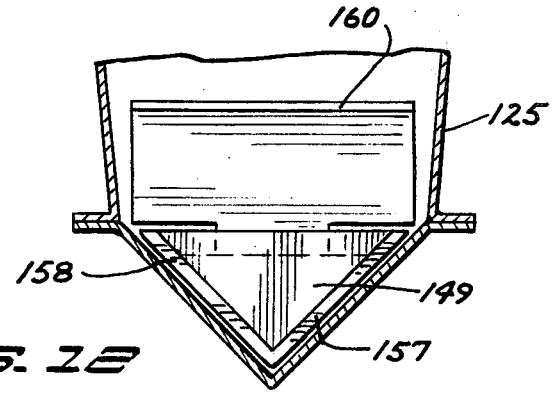
FIG. 12 is a sectional view of the manure handling system of FIG. 11 taken along the line 12—12 thereof.

Ram assembly 148 includes a pair of side plates 157, 158 (see FIG. 12) assembled in a V configuration and situated in conforming relationship to the side walls of pumping chamber 133. The forward edges of side plates 157, 158 are tapered and come to a forward point to form a plow-like front brace. A ram 149 is mounted between the side plates and is triangularly shaped to have a working face to substantially conform to the shape of pumping chamber 133 in the closed forward end 135 thereof. Ram 149 is shaped to push manure through the forward end 135 of chamber 133 and then through the gate 141 to discharge pipe 116.

Ram assembly 148 includes an auxiliary ram plate 160 pivotally connected proximate the top edge of ram 149 for operation in the area of inlet 131 of collection hopper 125. Auxillary ram plate 160 extends generally vertically from ram 149 into the area of inlet 131 as expanded by the front outlet wall 130. Auxillary ram plate 160 has a pin 161 engaged in a boss 162 secured to the ram 149 near the top edge thereof, whereby auxillary ram plate 160 is pivotal between a position extending generally vertically upward from ram 149 and a position extending horizontally from ram 149 in trailing relationship as shown in FIGS. 8 and 10. A spring assembly 164 is operative to bias the auxillary ram plate in the upright position.

As shown in FIG. 7, auxillary ram plate 160 operates in inlet 134 to move and compact manure located therein. Auxillary ram plate 160 substantially increases the working ram surface area in inlet 134 to compact the low density, high-bedding manure and force it to the forward portion 135 of pumping chamber 133. As ram assembly 148 advances in pumping chamber 133, auxillary ram plate 160 contacts the front outlet wall 130 (see FIG. 11). Front outlet wall 130 causes auxillary ram plate 160 to pivot to the horizontal position upon further advancement where it trails ram plate 149 in the forward portion 135 of pumping chamber 133 as shown in FIGS. 8 and 10.

A guide 165 is fastened to the rear wall of pumping chamber 133 in line with the rearward path of travel of auxillary ram plate 160 when it is in the horizontal orientation. As the ram assembly 148 is retracted, the auxillary ram plate remains in a horizontal position until it reaches the rear of the chamber. The edge of the auxillary ram plate 160 contacts guide 165 and is guided toward the vertical or upright orientation upon further rearward movement of the ram assembly 148.

A block 166 is mounted between the side plates 158, 159 of ram assembly 148 rearward of and spaced from ram 149. Rod 156 is connected to the block 166 for movement of ram assembly 148 therewith. Spring unit 164 includes a block-like rubber spring 168 disposed between the side plates 157, 158 and between ram 148 and block 166. A flapper or lever 169 is pivotally connected to the corner of block 166 adjacent rubber spring 168 and extends over the top of the rubber spring 168. An eccentric bar 170 is secured to auxillary ram plate 160 near the lower edge thereof and for rotation therewith. Rubber spring 168 exerts an upward moment on the lever 169. The free end of lever 169 bears against eccentric bar 170 to bias the auxillary ram plate in the upright position. The rubber spring 168 exerts such a moment on the auxillary ram plate 160 tending to return it to the upright position until such time as the auxillary ram plate has moved to the horizontal position. At such position, the moment art between the pivotal axis of the auxillary ram plate and the force exerted by lever 169 has been reduced to zero whereby no return moment is exerted upon the auxillary ram plate 160. This position is illustrated in FIG. 10. Other forms of the spring unit could be employed to bias the auxillary ram plate 160 in the upright position.

Figure 11:
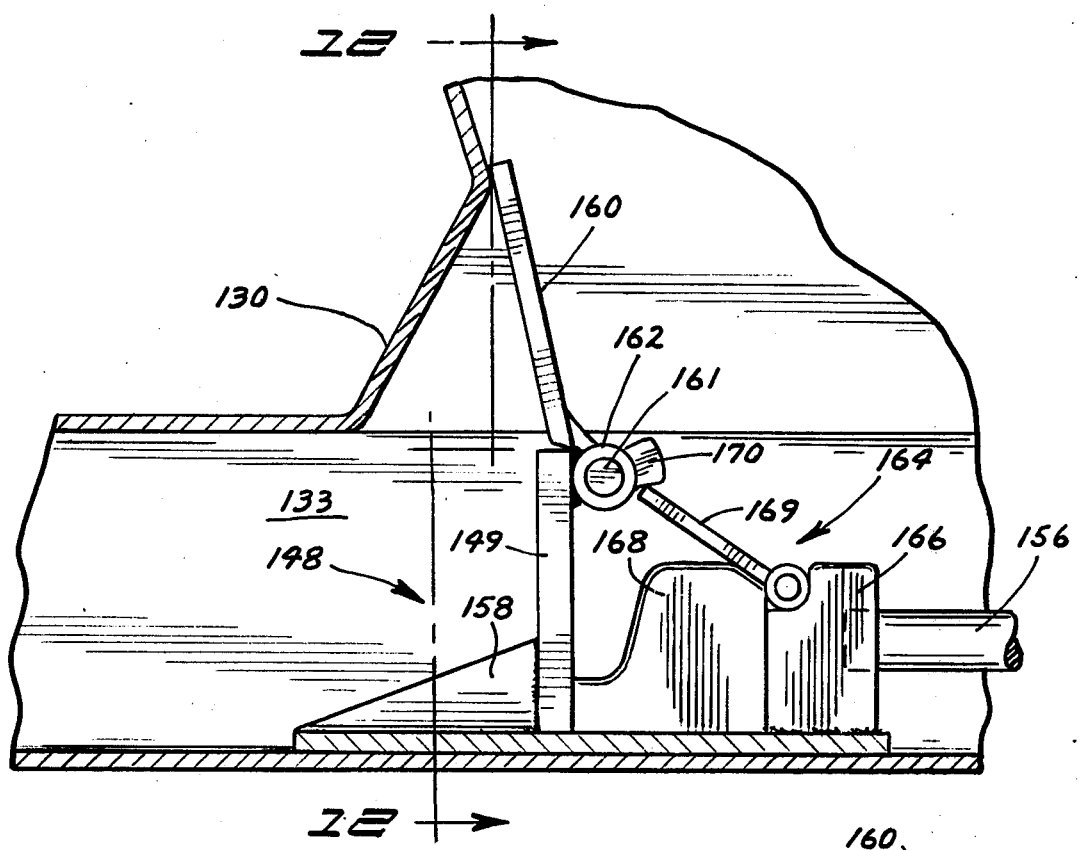
FIG. 11 is an enlarged fragmentary view in section showing a portion of the manure handling system of FIG. 6 with the ram assembly in an intermediate position in the pumping chamber.

In use, manure is loaded into collection hopper 125 through inlet 126 thereof. The manure can have a high-bedding content and will not bridge in throat area 129 due to the vertical extension thereof and aided by the expansion of outlet 131 due to forward outlet wall 130. As shown in FIG. 7, ram assembly 148 is advanced with auxillary ram plate 160 in the upright position and manure is pushed forward through the enlarged collection hopper outlet 131 and pumping chamber inlet 134. This manure-bedding mixture is compressed as it is moved forward. The presence of auxillary ram plate 160 in the outlet 131 aids in the prevention of bridging by inducing turbulence. As ram assembly 148 moves forward, a vacuum or suction is created behind it which draws manure down into the pumping chamber. Spring unit 164 biases the auxillary ram plate 160 in the upright position. As shown in FIG. 11, when the auxillary ram plate 160 reaches the forwardly extended wall 130, it is pivoted by that wall to the horizontal orientation shown in FIG. 10. Ram 149 continues through the forward portion 136 of pumping chamber 133 moving the now compacted manure-bedding mixture through the chamber and through the gate 141 to discharge pipe 116. There is no return moment on auxillary ram plate 160 in the forward end 135 of pumping chamber 133.

Ram assembly 148 is then retracted by the rod 156 and the auxillary ram plate 160 stays in the horizontal orientation as the ram assembly moves past the inlet forcing manure which has collected behind it to move up and over it. When the ram assembly 148 finally approaches the rear wall of the pumping chamber, the guide 165 causes the auxillary ram plate 160 to be moved from the horizontal orientation to the point where spring unit 164 can again bias it toward the upright configuration. The ram assembly 148 is then in position for another forward stroke.

Discharge pipe 116 can be a six inch or eight inch high pressure pipe capable of withstanding pressures of 100 to 160 psi. The cost of such pipe is low in comparison to the ten to twelve inch pipe commonly used, yet the manure pump of the invention permits use of such smaller diameter pipe even with a heavy bedding mixture.

The embodiments of the invention in which an exclusive property or privilege is claimed are defined as follows:

1. A manure handling system for movement of manure from a collection location to a storage location, including:
   a manure pump having a pump housing with walls defining an elongate, longitudinal pumping chamber having a triangular cross sectional shape with a downwardly directed apex;
   one-way valve means normally closing one end of said pumping chamber and movable to an open position to provide a discharge passage to permit discharge of manure from the chamber;
   one of said pump housing walls having an inlet opening to said pumping chamber located toward the end of the pumping chamber opposite said one-way valve means;
   a collection hopper mounted on said pump housing in communication with said inlet opening for collection of manure for transfer to the pumping chamber through the inlet opening;
   a ram located in said pumping chamber reciprocally movable between one end of said pumping chamber proximate the inlet opening to the other end of said pumping chamber towards said one-way valve means to move manure through the discharge passage against the influence of the one-way valve means;

said ram having a working face triangular in shape in conformance with the shape of said pumping chamber, said ram including a front, plow-like brace comprising a pair of triangularly shaped plates joined in a V configuration with an apex situated in and conforming to the apex of the pumping chamber, said plates extending forward from the working face of said ram and having rear edges integrally secured to the side edges of the working face of said ram; and means for reciprocation of said ram in said pumping chamber.

2. A manure handling system for movement of manure from a collection location to a storage location, including:

a manure pump having a pump housing with walls defining an elongate, longitudinal pumping chamber having a triangular cross sectional shape;

one-way valve means normally closing one end of said pumping chamber and movable to an open position to provide a discharge passage to permit discharge of manure from the chamber;

one of said pump housing walls having an inlet opening to said pumping chamber located toward the end of the pumping chamber opposite said one-way valve means;

a collection hopper mounted on said pump housing in communication with said inlet opening for collection of manure for transfer to the pumping chamber through the inlet opening;

a ram located in said pumping chamber reciprocally movable between one end of said pumping chamber proximate the inlet opening to the other end of said pumping chamber towards said one-way valve means to move manure through the discharge passage against the influence of the one-way valve means;

said ram having a working face triangular in shape in conformance with the shape of said pumping chamber;

means for reciprocation of said ram in said pumping chamber;

a circular cross sectional discharge pipe connected to said pump housing for movement of manure discharged from said pump to a storage location;

said one-way valve means including a closure plate movable between a position in closing relationship to the pumping chamber and an open position to provide said discharge passage; p1 said pumping chamber including a transition chamber located opposite said ram with respect to said closure plate;

flange means on the end of said housing describing a circular discharge opening connected to said discharge pipe;

said transition chamber having a plurality of triangular transition plates secured to the walls of the pump housing spanning the corners thereof and converging toward said discharge opening to promote smooth transition of manure flow from the triangular cross sectional shaped portion of the pumping chamber to the circular cross sectional shaped discharge pipe.

3. The manure handling system of claim 2 wherein:

said ram includes a front, plow-like brace comprising a pair of triangularly shaped plates joined in a V-configuration with an apex situated in and conforming to an apex of the pumping chamber, said plates extending forward from the working face of said ram in adjacent, close parallel relationship to pumping chamber side walls and having rear edges integrally secured to the side edges of the working face of the ram.

4. The manure handling system of claim 3 wherein:

said ram includes a rear brace comprising a second pair of triangularly shaped plates joined in a V-configuration with an apex situated in and conforming to an apex of the pumping chamber, said plates extending rearwardly from the working face of the ram in adjacent, close parallel relationship to pumping chamber side wall and having forward edges integrally secured to the side edges of the working face of the ram.

5. The manure handling system of claim 2 including:

bias means biasing the closure plate in the closed position, said closure plate pivotally connected to a wall of the pumping chamber, said bias means comprising a rubber spring means bearing between the closure plate and a wall of the transition chamber.

6. The manure handling system of claim 5 wherein:

said rubber spring means is interiorly fastened to said wall of the transition chamber wherein said pump housing forms an imperforate envelope open only at said inlet opening and said discharge opening.

7. The manure handling system of claim 5 wherein:

said hopper is mounted over the pump housing and has an upwardly open mouth for receipt of manure, a collar circumscribing said hopper beneath the mouth of the hopper, a cover attached to said collar and covering the lower portion of the housing and the manure pump to prevent contamination of the manure pump by manure being delivered into the mouth of the hopper.

8. The manure handling system of claim 2 including:

a heat insulative jacket surrounding said pump housing and a portion of said hopper to prevent heat loss from said pump housing.

9. The manure handling system of claim 8 including:

heat element means surrounding said pump housing between said pump housing and said insulative jacket to provide heat to the pumping chamber.

10. The manure handling system of claim 9 wherein:

said heat element means comprises a self-regulating heating cable.

11. The manure handling system of claim 10 including:

a second heat insulative jacket surrounding said discharge pipe.

12. The manure handling system of claim 11 including:

heat element means contiguous with said discharge pipe between said discharge pipe and the second insulative jacket.

13. The manure handling system of claim 12 wherein:

said second heat element means comprises a self-regulating heat tape.

14. The manure handling system of claim 13 wherein:

said hopper is mounted on top of the pump housing and has an upwardly open mouth for receipt of manure, a collar circumscribing said hopper beneath the mouth of the hopper, a cover attached to said collar and covering the lower portion of the housing and the manure pump to prevent contamination of the manure pump by material being delivered into the mouth of the hopper.

15. The manure handling system of claim 2 including:
a platform, said pump housing being mounted on said platform, and a pair of skids supporting said platform.

16. The manure handling system of claim 15 including:
a first heat insulative jacket covering said pump housing and a portion of said hopper, heat element means surrounding said pump housing between said pump housing and said first insulative jacket to supply heat to the pumping chamber.

17. The manure handling system of claim 16 including:
a second heat insulative jacket surrounding said discharge pipe, second heat element means surrounding said discharge pipe between said discharge pipe and said second heat insulative jacket.

18. The manure handling system of claim 2 wherein:
said means to reciprocate said ram in said chamber includes a rod mounting said ram, said rod being disposed in a double-acting hydraulic motor system, a first proximity switch located on said pump housing proximate one end of said pumping chamber, a second proximity switch located on said pump housing proximate the opposite end of said pumping chamber, a sensor located on said ram adapted to influence the first and second proximity switches when proximate thereto, said first and second proximity switches being connected to said double-acting hydraulic motor in such fashion to reverse direction of said rod in said pumping chamber when said sensor on the ram comes proximate to a proximity switch.

19. The manure handling system of claim 18 wherein:
said first and second proximity switches are located on the outside of said pump housing walls wherein said pump housing forms an imperforate envelope open only at said inlet opening and said discharge opening.

20. A manure handling system for placement above ground to receive manure of high bedding content transferred by a barn cleaning system which includes a conveyor to carry manure from inside the barn to the manure handling system, said manure handling system including:
a manure pump having a pump housing with walls defining an elongate, longitudinal pumping chamber;
a valve means normally closing one end of the pumping chamber and movable to an open position to provide a discharge passage to permit discharge of manure from the pumping chamber;
one of said pump housing walls having an inlet opening to said pumping chamber located toward the end of said chamber opposite said valve means;
a collection hopper mounted above said pump housing in communication with said inlet opening for receipt of manure from a conveyor system for transfer to the pumping chamber through the inlet opening;
a ram located in said pumping chamber reciprocally movable between one end of said pumping chamber proximate the inlet opening and the other end of the pumping chamber proximate said valve means to move manure through the discharge passage against the influence of the valve means;
means for reciprocation of said ram in said pumping chamber; p1 a discharge pipe connected to said housing in position to receive manure moved out of said pumping chamber by said ram, said discharge pipe having at least a portion above ground and extendible to a manure storage location;
first heating element means surrounding the pump housing to heat the pumping chamber;
first insulative jacket means surrounding the pump housing, the first heating element means, and a portion of the hopper to retain heat therein;
second heating element means located contiguous to the surface of said discharge pipe portion above ground to heat the interior of the discharge pipe portion; and
second heat insulative jacket means surrounding the discharge pipe and the second heating element means to retain heat therein.

21. The manure handling system of claim 20 wherein:
said first and second heating element means comprised as self-regulating heat cables.

22. The manure handling system of claim 20 wherein:
said pump housing walls define said pumping chamber as triangular in cross sectional shape with a downwardly directed apex;
said ram having a working face triangular in shape in conformity with the shape of the pumping chamber.

23. A manure handling system for placement above ground to receive manure of high bedding content transferred by a barn cleaning system which includes a conveyor to carry manure from inside the barn to the manure handling system, said manure handling system including:
a manure pump having a pump housing with walls defining an elongate, longitudinal pumping chamber;
a valve means normally closing one end of the pumping chamber and movable to an open position to provide a discharge passage to permit discharge of manure from the pumping chamber;
said valve means including a closure plate pivotally connected to a wall of the pumping chamber, bias means biasing the closure plate in a closed position, said bias means comprising rubber spring means bearing between the closure plate and a wall of the pump housing;
one of said pump housing walls having an inlet opening to said pumping chamber located toward the end of said chamber opposite said closure plate;
a collection hopper mounted above said pump housing in communication with said inlet opening for receipt of manure from a conveyor system for transfer to the pumping chamber through the inlet opening;
a ram located in said pumping chamber reciprocally movable between one end of said pumping chamber proximate the inlet opening and the other end of the pumping chamber proximate said closure plate to move manure through the discharge passage against the influence of the bias means;
means for reciprocation of said ram in said pumping chamber;
a discharge pipe connected to said housing in position to receive manure moved out of said pumping chamber by said ram, said discharge pipe having at least a portion above ground and extendible to a manure storage location;

first heating element means surrounding the pump housing to heat the pumping chamber;

first insulative jacket means surrounding the pump housing and a portion of the hopper to retain heat therein;

second heating element means located contiguous to said discharge pipe to heat the interior of the discharge pipe; and second heat insulative jacket means surrounding the discharge pipe and the second heating element means to retain heat therein.

24. The manure handling system of claim 23 wherein:

said rubber spring means is interiorly fastened to said wall of the pump housing wherein said pump housing forms an imperforate envelope open only at said inlet opening and said discharge passage.

25. The manure handling system of claim 22 wherein:

said pump housing walls also define a transition chamber located opposite said pumping chamber with respect to said closure plate;

flange means on the end of the pump housing describing a circular discharge opening connected to the discharge pipe;

said transition chamber including a plurality of triangular transition plates secured to the walls of the pumping chamber spanning the corners thereof and diverging towards said discharge opening to promote smooth transition of manure flow from the triangular cross sectional shaped portion of the pumping chamber to the circular cross sectional shaped discharge pipe.

26. The manure handling system of claim 25 wherein:

said ram includes a front, plow-like brace comprising a pair of triangularly shaped plates joined in a V configuration with an apex situated in and conforming to the apex of the pumping chamber, said plates extending forward from the working face of said ram and having rear edges integrally secured to the side edges of the working face of said ram.

27. The manure handling system of claim 26 wherein:

said ram includes a rear brace comprising a second pair of triangularly shaped plates joined in a V configuration with an apex situated in and conforming to the apex of the pumping chamber, said plates extending rearwardly from the working face of the ram and having forward edges integrally secured to the side edges of the working face of the ram.

28. A manure handling system for movement of manure from a collection location to a storage location, including:

a manure pump having a pump housing;

said pump housing having interior walls defining an elongate, horizontal pumping chamber having a forward end and a rearward end;

said housing having a wall with an inlet opening to the chamber proximate the rearward end of the chamber;

the interior walls of said pump housing being orientated to converge away from the inlet opening whereby the inlet opening occurs at the location of the widest horizontal dimension of the chamber for facilitating receipt of manure;

one-way valve means normally closing the forward end of the pumping chamber and movable to an open position to provide a discharge passage to permit discharge of manure from the chamber;

a collection hopper mounted on said pump housing with an outlet in communication with said inlet opening for collection of material for transfer to the pumping chamber through the inlet opening;

a ram located in the pumping chamber reciprocally movable between the rearward end of the pumping chamber and the forward end of the pumping chamber to move material through the discharge passage against the influence of the valve means;

said ram having a working face generally shaped in conformance with the shape of the pumping chamber;

means for reciprocation of said ram in said pumping chamber;

a circular cross sectional discharge pipe connected to said pump housing for movement of manure discharged from said pump to a storage location;

said pumping chamber including a transition chamber located opposite said valve means with respect to said ram;

means on the end of said housing describing a circular discharge opening connected to said discharge pipe;

said transition chamber having a plurality of triangular transition plates secured to the walls of the pump housing spanning the corners thereof and converging toward said discharge opening to promote smooth transition of manure flow from the pumping chamber to the circular cross sectional shaped discharge pipe.

29. The manure handling system of claim 28 including:

bias means for biasing the one way valve means in a closed position with respect to the pumping chamber.

30. The manure handling system of claim 28 including:

an auxillary ram plate pivotally connected to the upper edge of said ram and operable in a position generally vertically extended from said ram to move in the inlet portion of said chamber to move manure therethrough, and pivotal to a position generally horizontally extended from said in a direction toward the rearward end of the chamber as said ram advances to position in the forward portion of the chamber beyond the inlet opening.

31. The manure handling system of claim 30 including:

bias means associated with the auxillary ram plate to bias it toward said position generally vertically extended from said ram.

32. A manure handling system for movement of manure from a collection location to a storage location, including:

a manure pump having a pump housing;

said pump housing having interior walls defining an elongate, horizontal pumping chamber having a forward end and a rearward end;

said housing having a wall with an inlet opening to the chamber proximate the rearward end of the chamber;

the interior walls of said pump housing being orientated to converge away from the inlet opening whereby the inlet opening occurs at the location of the widest horizontal dimension of the chamber for facilitating receipt of manure;

one-way valve means normally closing the forward end of the pumping chamber and movable to an open position to provide a discharge passage to permit discharge of manure from the chamber;

a collection hopper mounted on said pump housing with an outlet in communication with said inlet opening for collection of material for transfer to the pumping chamber through the inlet opening;

said collection hopper including a plurality of sidewalls downwardly converging to a hopper throat portion, a forwardly extended hopper outlet wall extended from the hopper throat portion to the pump housing providing an expanding hopper outlet in communication with the inlet opening to the pumping chamber;

a ram located in the pumping chamber reciprocally movable between the rearward end of the pumping chamber and the forward end of the pumping chamber to move material through the discharge passage against the influence of the valve means;

said ram having a working face generally shaped in conformance with the shape of the pumping chamber; and means for reciprocation of said ram in said pumping chamber.

33. The manure handling system of claim 32 including:

an auxillary ram plate pivotally connected to the upper edge of said ram and operable in a position generally vertically extended from said ram to move in the inlet portion of said chamber and the expanded hopper outlet to move manure therethrough, and pivotal upon contact with the forwardly extended hopper outlet wall to a position generally horizontally extended from said ram in trailing relationship when said ram advances to position in the forward portion of the chamber beyond the inlet opening.

34. A manure handling system for movement of manure from a collection location to a storage location, including:

a manure pump having a pump housing;

said pump housing having interior walls including a top wall and side walls defining an elongate, horizontal pumping chamber having a forward end and a rearward end;

said top wall having an inlet opening at the top of the chamber proximate the rearward end thereof;

one way valve means normally closing the forward end of the pumping chamber and movable to an open position to provide a discharge passage to permit discharge of manure from the pumping chamber;

a collection hopper mounted on said pump housing and having a hopper outlet in communication with said chamber inlet opening for transfer of manure to the pumping chamber through the inlet opening;

a ram assembly located in the pumping chamber and including a ram having a working face shaped generally in conformance with the shape of the pumping chamber and reciprocally movable in the pumping chamber between the rearward end of the pumping chamber and the forward end of the pumping chamber to move material to the forward end of the pumping chamber through the discharge passage;

means for reciprocation of the ram assembly in the pumping chamber;

said ram assembly including an auxillary ram plate pivotally connected proximate the upper edge of the ram and operable in a position generally vertically extended from said ram to move manure located in the inlet opening of the chamber and outlet of the hopper, said auxillary ram plate being pivotable to a position in horizontal trailing relationship to the ram when the ram advances to a position toward the forward end of the chamber beyond the inlet opening; and bias means normally biasing the auxillary ram plate in position generally vertically extended from the ram.

35. The manure handling system of claim 34 wherein:

said collection hopper includes side walls downwardly converging to a throat portion, a front outlet wall extended from the throat portion to the pump housing to define an expanding hopper outlet in communication with the pumping chamber inlet opening, said auxillary ram plate being movable in the expanded hopper outlet in said generally vertical position with respect to the ram and in position to contact part of the front outlet wall when the ram assembly advances toward the forward portion of the chamber whereby the part of the front outlet wall causes pivotal movement of the auxillary ram plate to the generally horizontal trailing position.

36. The manure handling system of claim 35 wherein:

said bias means includes an eccentric bar secured to the auxillary ram plate, a rubber spring located on the ram assembly behind the ram, a lever pivotally connected at one end to a portion of the ram assembly behind the rubber spring and extended over the rubber spring with a free end bearing against the eccentric bar in position such that the rubber spring biases the free end of the lever upward so that the lever exerts a moment against the eccentric bar to tend to bias the auxillary ram plate toward said vertical position with respect to the ram.

37. The manure handling system of claim 36 wherein:

said lever is positioned relative to the eccentric bar on the auxillary ram plate such that moment arm of the lever with respect to the axis of rotation of the auxillary ram plate is reduced to zero when the auxillary ram plate is moved to the generally horizontal trailing position.

38. The manure handling system of claim 37 including:

guide means located at the rearward end of the pumping chamber in position to guide the auxillary ram plate from said horizontal trailing position toward the vertical position with respect to the ram when the ram assembly is moved rearwardly in the pumping chamber.

39. The manure handling system of claim 34 wherein:

said bias means includes an eccentric bar secured to the auxillary ram plate, a rubber spring located on the ram assembly behind the ram, a lever pivotally connected at one end to a portion of the ram assembly behind the rubber spring and extended over the rubber spring with a free end bearing against the eccentric bar in position such that the rubber spring biases the free end of the lever upward so that the lever exerts a moment against the eccentric bar to tend to bias the auxillary ram plate toward said vertical position with respect to the ram.

40. The manure handling system of claim 39 wherein:

said lever is positioned relative to the eccentric bar on the auxillary ram plate such that the moment arm of the lever with respect to the axis of rotation of the auxillary ram plate is reduced to zero when the auxillary ram plate is moved to said generally horizontal trailing position.

41. The manure handling system of claim 40 including:
guide means located at the rearward end of the pumping chamber in position to guide the auxillary ram plate from said horizontal trailing position toward the vertical position with respect to the ram when the ram assembly is moved rearwardly in the pumping chamber.

42. A manure handling system for movement of manure from a collection location to a storage location including:
a manure pump having a pump housing with walls defining an elongate, horizontal pumping chamber having a forward end and a rearward end;
said housing having a top wall with an inlet opening proximate the rearward end of the chamber;
one-way valve means normally closing the forward end of the chamber and movable to an open position to provide a discharge passage to permit discharge of manure from the chamber;
bias means biasing the one-way valve means in a closed position with respect to the pumping chamber;
pump means in the chamber to move manure received from the inlet opening toward the forward end and out of the discharge passage against the bias of the bias means acting on the one-way valve means;
a collection hopper mounted above said pump housing with an outlet in communication with inlet opening for collection of manure for transfer to the pumping chamber through the inlet opening;
said collection hopper including a plurality of sidewalls assembled in downwardly converging relationship to a hopper throat portion; and
a forwardly extended outlet wall extending from said hopper throat portion of the collection hopper to the pump housing to provide an expanding collection hopper outlet opening in communication with the inlet opening of the pumping chamber.

43. A manure handling system for movement of manure from a collection location to a storage location, including:
a manure pump having a pump housing;
said pump housing having walls defining an elongate horizontal pumping chamber having a forward end and a rearward end;
said housing having a wall with an inlet opening to the chamber proximate the rearward end of the chamber;
one-way valve means normally closing the forward end of the pumping chamber and movable to an open position to provide a discharge passage to permit discharge of manure from the chamber;
said valve means including a closure plate pivotally connected to a wall of the pumping chamber, bias means biasing the closure plate in a closed position, said bias means comprising a rubber spring interiorly fastened to a wall of the pumping chamber bearing between the closure plate and the wall of the pumping chamber wherein said pump housing forms an imperforate envelope open only at the inlet opening and discharge passage.

* * * * *

UNITED STATES PATENT AND TRADEMARK OFFICE
CERTIFICATE OF CORRECTION

PATENT NO. : 4,140,443
DATED : February 20, 1979
INVENTOR(S) : David A. Olson

It is certified that error appears in the above—identified patent and that said Letters Patent are hereby corrected as shown below:

Column 10, line 21 "136" should be --135--.

Column 11, line 54 remove "pl".

Column 14, line 4 remove "pl".

Signed and Sealed this

Twelfth Day of June 1979

[SEAL]

Attest:

RUTH C. MASON
Attesting Officer

DONALD W. BANNER
Commissioner of Patents and Trademarks